Figure 1:
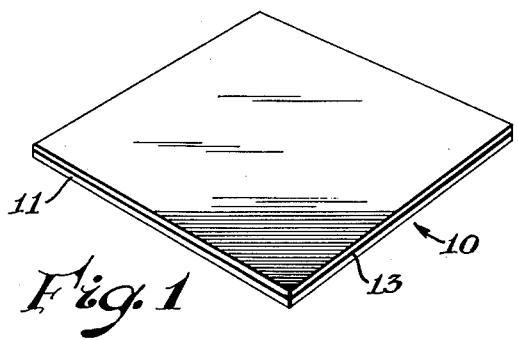

July 7, 1964 G. H. LACY ETAL 3,140,196
LAMINATE FOIL
Filed April 27, 1959

INVENTORS.
George H. Lacy
Raymond R. Chervenak
BY Jerome Rudy
ATTORNEY

United States Patent Office 3,140,196
Patented July 7, 1964

3,140,196
LAMINATE FOIL
George H. Lacy, Rocky River, and Raymond R. Chervenak, Cleveland, Ohio, assignors to The Dow Chemical Company, Midland, Mich., a corporation of Delaware
Filed Apr. 27, 1959, Ser. No. 809,244
20 Claims. (Cl. 117—75)

The present invention contributes to the art of providing foil and analogous sheet-like structures for wrapping, packaging, decorative and related purposes. More particularly, this invention pertains to new and useful foil structures comprised of a layer of polyethylene or the like non-aromatic hydrocarbon (i.e., aliphatic) olefin polymer that is effectively and efficiently laminated or bonded to and, as it were, supported upon and by a pre-formed substrate layer or sheet of metal foil, such as aluminum foil or lead foil.

Films and other shaped articles of polyethylene, polypropylene and the like non-aromatic hydrocarbon olefin polymers have many attractive characteristics including, in general: pronounced chemical inertness; good physical properties (especially significant strength, toughness and resistance to tearing); excellent behavior, without marked tendency to embrittlement, at low temperatures; satisfactory moisture vapor barrier properties; and, in particular, unusual capability for and easy susceptibility of being heat sealed in order to form and provide strong, permanent joints upon being thermally welded or fused together when in contact under the influence of heat at elevated temperatures and, if desired, pressure along the seam or other welded area being joined.

The latter feature, as is well known and widely appreciated by those skilled in the art, is of great desirability and decided advantage for fabrication of film and analogous sheet-like structures into many useful articles and products (such as bags, pouches, etc.) and in the general utilization thereof for many wrapping and packaging applications. Incidentally, such feature and characteristic is not readily obtainable insofar as practical wrapping and packaging operations are concerned in foil and analogous sheet-like articles that are comprised of such metals as aluminum or lead. These metals, insofar as practical requirements are a factor, are relatively thermally insensitive materials that do not generate any seal strength upon being attempted to be heat sealed or thermally welded together at relatively low temperatures, such as those useful for sealing polyethylene.

On the other hand, certain metal foil, particularly aluminum, besides having excellent general properties and characteristics as wrapping materials, have particurlarly desirable resistance to chemical attack from many substances and, in addition, possess an unusual ability to provide particularly effective barriers against the transmission or permeation of gases and vapors other than water vapor. Furthermore, metal foil generally has exceptionally decorative and pleasing appearance and characteristics.

Despite the obvious beneficial utility as a flexible, vapor-proof film or foil article or analogous sheet-like structure which would be easily susceptible to being heat sealable that could be provided by composite laminate structures comprised of polyethylene and the like non-aromatic hydrocarbon film bonded or laminated to an aluminum or lead sheet or foil, much difficulty has been experienced in their derivation. This is because of the inefficient bonding and poor adherence that is experienced when metal foil is attempted to be formed into composite structures with polyethylene and the like film and other articles.

Polyethylene and the like film and other articles, as is well known, commonly have a smooth and sleek, relatively slippery and wax like surface which is poorly adapted to provide for suitable adhesion or anchorage of applied materials by mere physical attachment. In addition, the relatively inert chemical nature of polyethylene and the like non-aromatic hydrocarbon polyolefins resist the efficient attachment of most materials by chemical interlinkage or bonding.

It is among the principal objects of the present invention to provide an efficient and effective method of coating or laminating foils or analogous sheet-like substrates of aluminum or lead with tightly adhering, integral layers of non-aromatic hydrocarbon olefin polymers including, in particular, polyethylene, polypropylene and the like compositions. It is also an object of the invention to provide utile laminate or composite structures of aluminum or lead foil efficaciously laminated to and bonded with coated layers of polyolefins, such as polyethylene, which composite structures or articles are particularly adapted for employment as flexible, vapor-proof materials, particularly capable of being joined or thermally welded by conventional heat sealing techniques, for packaging and the like protective and decorative uses.

All of the foregoing and still further objects and advantages are readily achieved by practice of and in accordance with the present invention wherein foil and analogous sheet-like substrates of aluminum or lead, particularly the former, are effectively provided with a tightly adhered and firmly anchored coating or sheet-like layer of laminated polyethylene or the like non-aromatic hydrocarbon olefin polymer (including, as has been indicated, polypropylene, polybutylene, copolymers of ethylene and propylene, etc.) by a method which comprises initially applying to the surface of the metal substrate (or treating such surfaces with) a small quantity of a polyalkylene imine compound as an intermediate adhesion-promoting coat or layer; and subsequently applying over the polyalkylene-imine treated surface of the metal substrate a fused or molten sheet-like coating layer of the desired polyolefin polymer; then cooling and solidifying the deposited polyolefin layer on the polyalkyleneimine treated surface of the metal substrate.

The resulting composite or laminated film or foil structures or articles which may advantageously be obtained by practice of the present invention possess, to an unusual degree, practically all of the desirable and beneficial attributes and properties of both the metal substrate layer and the applied polyolefin layer that are laminated therein. In addition, as indicated, the resulting composite structures are heat sealable in the conventional manner when joined under thermal welding conditions by means of the applied and laminated polyolefin layer. Besides, the applied polyolefin layer tends to material reinforce and enhance the general strength and tear resistance of the metal foil as well as to serve to plug pin holes and other imperfections that may occur in the thin metal substrate.

Figure 2:
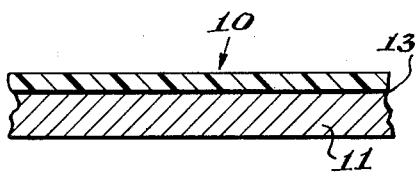
Figure 3:
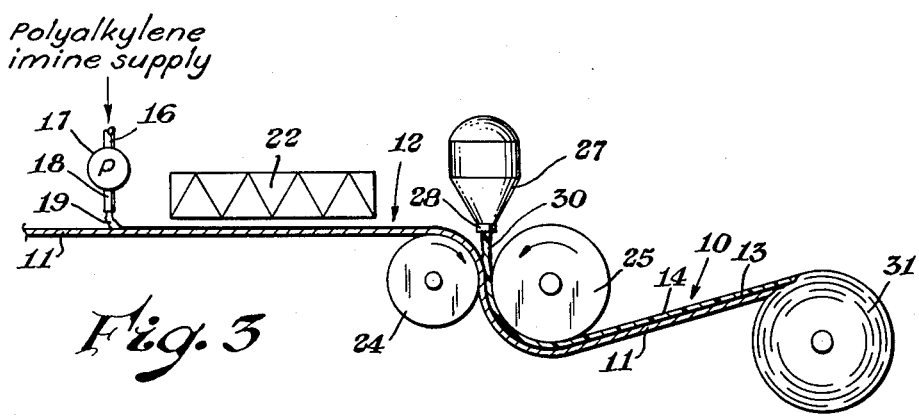
Figure 4:
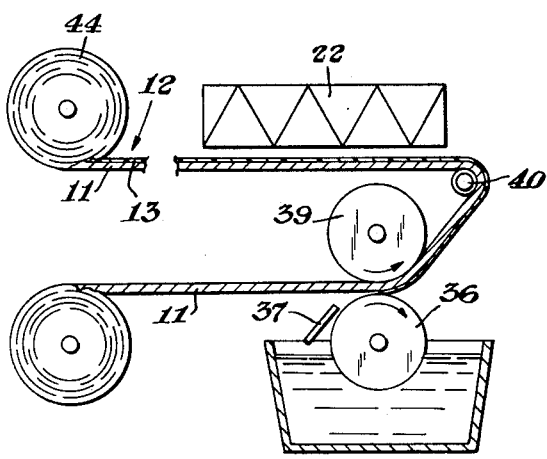
Figure 5:
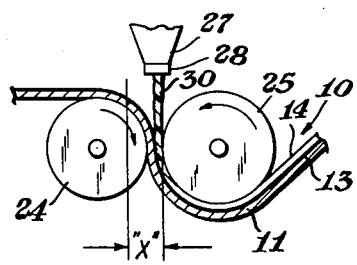

Yet additional objects and advantages of the invention, and its numerous cognate benefits and features, are even more apparent and readily manifest in and by the ensuing description and specification, taken in conjunction with the accompanying drawing in which, wheresoever possible, like characters of reference designate corresponding materials and parts throughout the several views thereof, and wherein:

FIGURE 1 perspectively depicts a composite or laminate foil structure in accordance with the invention;

FIGURE 2 illustrates the laminate structure of FIGURE 1 in fragmentary cross-section;

FIGURE 3, in schematic and diagrammatic elevation, partly in cross-section, illustrates one means of preparing the laminated foil products of the invention;

FIGURE 4 shows a means of pre-applying the intermediate polyalkylene imine adhesion promoting coating to the metal foil substrate in order to provide pre-treated stock satisfactory for subsequent manufacture of the desired laminated, sheet-like products; and FIGURE 5, represented in a manner analogous to that of FIGURES 3 and 4, schematically more particularly demonstrates the application of the polyolefin layer to the treated substrate.

With initial reference to FIGURES 1 and 2, there are illustrated the laminated foil products of the present invention, generally designated by the reference numeral 10. The composite foil 10 is comprised of an aluminum or lead foil or sheet layer 11 over which there is deposited an intermediate adhesion-promoting coat or layer 13 of a small quantity of polyalkylene imine that is applied in a uniform or substantially uniform and relatively thin formation, to and with which there is effectively and efficiently laminated or bonded a coated layer 14 of the polyolefin polymer.

While the metal foil layer 11 is herein generally referred to as the "substrate" or "base" and the polyolefin layer 14 as the applied layer or coating, it is readily apparent and will be understood by those who are skilled in the art that such terminology and description is merely for sake of convenience and identification. It is not to be construed or taken as being limiting or absolutely definitive of the presently obtained and provided structures. As is obvious, the polyolefin layer 14, which has been laminated with the metal foil 11, is just as capable in most instances (and for many ultimate applications of the resulting laminated product) of being characterized as the "substrate" or "base" layer.

As mentioned, the composite, laminated foil product 10 retains the essential and advantageous properties of both of the metal and polyolefin layers in the bonded integral structure. It is strong, tough and tear-resistant and has an attractive and highly decorative appearance. Its metal surface tends to be more scuff-resistant and harder-to-mar than plain polyethylene and the like non-aromatic hydrocarbon polymers. In addition, the laminated foil product generally remains strong and flexible at relatively low temperatures and, of great significance, are extremely impermeable to most gases and vapors, being particularly effective moisture barriers.

Of paramount importance, as has been mentioned, the composite foil product is capable of being strongly and efficiently heat sealed by joinder of the laminated polyolefin surfaces under the usual conditions in conventional thermal welding operations for plastic film.

The composite foil or sheet-like products of the present invention are possessed of a strong and effective bond between the laminated metal and polyolefin layers 11 and 14, respectively. In most instances, the joined layers are extremely difficult, if not impossible, to strip apart or delaminate by ordinary physical methods.

The composite foil and analogous sheet-like structures of the present invention have particular utility as wrapping and packaging materials for foodstuffs (as in the preparation of gas flush packages for cheeses and so forth) and for other articles such as pharmaceuticals, medicinal products, hardware, etc., especially in instances when it is desired to protect the packaged article from unwanted change in moisture content. The foil products are also advantageous for wrapping and packaging foodstuffs and other materials which are intended to be handled or maintained and stored at relatively low temperatures in a refrigerated, or even in a frozen condition. Besides providing protection as a strong and tough flexible covering, they also more effectively prevent dehydration of the packaged articles and, where required, tend to avoid development of the condition known as "freezer burn" which frequently occurs in inadequately protected frozen foods.

Although the advantageous composite articles resulting from practice of the present invention are herein predominantly illustrated and described as film, foil and similar sheet-like products, it is readily apparent that in many instances other composite structures and articles may also be prepared and provided such as and including tubes, flexible bottles, cartons, boxes and other containers, and liners therefor, and so forth.

Advantageously, the metal substrate foil 11 which is laminated with the applied polyolefin layer is a relatively thin foil or sheet-like structure of aluminum or lead. Likewise, the laminated layer 14 of the polyolefin resin that is bonded to the metal substrate by the intermediate polyalkylene imine adhesion promoting coating 13 on the surface of the substrate is a relatively thin deposit. In this way, there is provided an ultimate laminated foil product 10 of corresponding relatively little thickness.

Of course, as is apparent, protective coating layers, applied in accordance with the practice of the present invention can also be provided over much thicker sheets or other substrate layers of aluminum or lead. When a true foil product is not desired, the thickness of the metal substrate layer, as is obvious, is not of material consequence.

For the manufacture of laminate metal foil products, however, beneficial results are generally obtainable when the substrate metal foil 11 has a thickness of at least about ¼ mil and not greatly in excess of about 10 mils. It is frequently more desirable for the substrate metal foil structure to have a thickness between about ⅓ mil and ½ mil.

Likewise, it is generally advantageous for the laminated polyolefin layer to have a thickness between about ¼ mil and about 10 mils and may frequently be more advantgeous for the thickness of the applied polyolefin layer to be between about 1 and 2 mils.

Thus, the total thickness of the composite foil product may advantageously be between about ½ mil and about 20 mils and, frequently more advantageously, between about 1½ and 2½ mils.

As indicated, the metal foil substrates that are contemplated as being adapted for employment in the practice of the present invention are those of aluminum and lead, particularly the former. If desired, such substrates may be paper-backed or may contain other materials laminated to one of the surfaces of the metal foil without diminishing from the advantage and benefit to be derived by practice of the present invention wherein the polyolefin layer is laminated over the polyalkylene imine-treated free surface of the metal. Of course, as is readily apparent and as is contemplated herein, the aluminum or lead substrate, utilized in the present practice, can, if desired or suitable, actually be foil-forming alloys or other compositions of these metals with other metals or materials that can be alloyed therewith. As is apparent, the surface of the metal should be in a clean and free-from-contamination condition prior to its use for present purposes.

The polyethylene or other non-aromatic hydrocarbon polyolefin which is employed in the practice of the present invention may be polymers of any normally solid and film forming nature. For example, the polymers of ethylene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, the ethylene and other non-aromatic hydrocarbon olefin polymers may be essentially linear and unbranched polymers, or polyolefin products similar to these materials. The essentially linear and unbranched, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 grams per cubic centimeter; and melting points in the neighborhood of 125–135° C. They are also ordinarily found to have a more crystalline nature than conventional polyethylenes and may contain less than 3.0 and even less than 0.3 methyl radicals per 100 methylene groups in the polymer molecule. The essentially linear and unbranched polymers of ethylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV–B, V–B and VI–B metals of the Periodic System; chromium oxide on silicated alumina; hexavalent molybdenum compounds; and charcoal supported nickel-cobalt.

As is apparent, the polyolefin polymers utilized in the practice of the present invention are generally prepared by polymerization of monoolefinic aliphatic olefin monomers, such as ethylene, propylene, butylene and so forth (including polymerizable mixtures thereof) that contain from 2 to about 8 carbon atoms, which monomeric olefins are frequently known as being 1-olefins due to their characteristic terminally unsaturated structures.

The polyalkylene imines which are utilized for providing the intermediate adhesion-promoting coating deposit 13 in the composite foil structures of the invention to secure the desired effective lamination between the metal and polyolefin layers 11 and 14 are advantageously one of the polyethylene imines which are of the general structure:

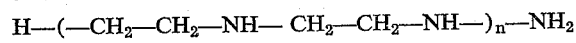

in which $n$ has a numerical value of at least 1 and may be a larger, plural integer having a value as great as 1,000–2,000 and more. Thus, when a polyethylene imine is utilized for treating the surface of the substrate, it may be of any desired molecular weight in which the material can be obtained. It is generally most advantageous, however, to avoid use of very low molecular weight materials having excessive volatilities.

As is apparent, other polyalkylene imines equivalent to polyethylene imines (obtained by polymerization, in the known way, of the corresponding alkylene imines) may also be utilized as an intermediate adhesion-promoting coat to treat the surface of the substrate layer in place of, or in combination with, the polyethylene imine. Ordinarily it is of greatest practical significance for these to include any of the homologous polyalkylene imines which are comprised of alkylene units of less than about 4 carbon atoms. In most cases, although no limiting implications are intended, the polyalkylene imines of greatest interest to employ are the relatively low polymer, water-soluble materials whose viscosity in 20 percent aqueous solution at 20° C. are on the order of 100 poises.

Only a very small quantity of the polyalkylene imine need be deposited as an intermediate adhesive promoting coating on the surface of the metal foil substrate to which the polyethylene or other non-aromatic hydrocarbon polymer layer is laminated. In general, an amount between about 5 grams and 100 grams per thousand square feet of substrate surface are suitable to facilitate and promote the adhesive of the polyolefin polymer layer on the substrate surface being laminated. Frequently, between about 20 and 50 grams per thousand square feet provides an entirely satisfactory result.

Although it can be directly applied if desired, the deposition of the polyalkylene imine is generally better and more conventionally and easily accomplished from a solution or dispersion of the adhesion-promoting agent in a suitable solvent, such as acetone, methyl ethyl ketone, methyl isopropyl ketone, lower alkyl alcohols (particularly those of less than 4 carbon atoms) etc. Methanol, ethanol and isopropanol are oftentimes found to provide optimum solvent behavior for the polyalkylene imine.

Advantageously, a relatively dilute solution of the polyalkylene imine treating agent in the solvent is employed, such as one having a concentration of the polyalkylene imine between about 0.01 and 2 percent. Frequently, it is even more beneficial for the applicating solution of the polyalkylene imine to contain between about ⅛ and ½ percent by weight of the dissolved adhesion promoting agent. This facilitates the uniform and general deposition over the surface of the substrate of the relatively minute quantities of polyalkylene imine needed for the intermediate adhesion promoting coating on the metal substrate prior to deposit or placement of the polyolefin polymer layer being laminated.

When the polyalkylene imines (such as polyethylene imine) are employed in too great a concentration on the substrate surface, they end to result in undesirably weak and unsatisfactory laminated structures.

The coating application of the polyalkylene imine anchor layer may be made by spraying or spread coating the solution thereof on the surface of the metal substrate being laminated to the polyolefin layer. Necessarily, the coating of the strongly cationic polyalkylene imine agent is dried by air or by means of heat at an elevated temperature on the surface of the aluminum or lead substrate prior to actual application thereover of the polyolefin layer being laminated therein.

In this connection, it is generally desirable to employ a relatively fugacious solvent in order to allow rapid and ready drying (with minimized or no external application of heat) of the applied polyalkylene imine solution. Thus, isopropanol, ethanol, or methanol are, as has been indicated, most beneficial to employ as solvents for the applicating solution of the polyalkylene imine. Such solvents can be easily dried in cool air (such as air at room temperature or with minimum requirements for heat) to deposit the adhesion-promoting intermediate layer of the polyalkylene imine on the surface of the substrate. Frequently, however, the use of warm air is found to be more practical for drying, especially when conditions of relatively high humidity in the atmosphere are encountered.

With reference to FIGURE 3 of the drawing, there is illustrated one means of manufacturing the composite foil products of the present invention. As shown, the substrate 11 (which, as indicated, may advantageously be aluminum foil) is passed from any suitable source of supply (not shown) under a point at which the polyalkylene imine is applied to its surface. This may be accomplished, as illustrated, by a spray 19 of a suitable applicating solution or other composition of the polyalkylene imine which is directed from a nozzle 18 controlled by a valve 17 to handle the polyalkylene imine solution in the conduit 16 from any suitable source of supply (not shown).

After application on the surface of the substrate 11, the polyalkylene imine-treated material is passed through a drying oven, illustrated schematically by the reference numeral 22, which heats the applied material sufficiently to remove all solvent vehicle therefrom prior to lamination of the polyolefin layer to the polyalkylene imine-treated substrate surface. While the drying oven 22 may generate any suitable temperature adequate to vaporize the solvent vehicle from the polyalkylene imine (but lower than that which might degrade the applied material), it is generally advantageous to operate the oven in the neighborhood of 150° F. when the solvent vehicles of usual interest are employed in the polyalkylene imine solution. In this connection, as has been indicated, it is necessary to dry the polyalkylene imine adhesion-promoting layer completely from any associated solvent vehicle before passing the pre-treated substrate, indicated generally by reference numeral 12, to the subsequent polyolefin laminating operation.

After being dried on the surface of the substrate, the polyalkylene imine-treated material 12 is laminated with the desired polyolefin layer 14. This may be accomplished by passing the pretreated substrate 12 between the nip of a pair of cooperating rolls consisting of a back-up roll 24 and a chill roll 25, driven by any suitable means and operating in the directions indicated by the arrows, wherein the molten polyolefin layer is applied to the pretreated substrate 12 and chilled and efficiently laminated to form the composite foil product.

Thus, the polyolefin may be contained in an extruder 27, of any conventional or desired construction, adapted to expel a falling sheet-like layer or curtain 30 of molten polyolefin through a suitable die orifice 28 onto the surface of the pretreated substrate 12 in the nip of the rolls 24, 25. It is generally advantageous to maintain the polyolefin in the extruder, particularly when it is polyethylene, at a temperature sufficiently high to ensure its remaining in a fused and molten condition after being passed from the die to fall through the air as a layer on the surface of the pretreated film. Thus, it is generally desirable for the extruded polymer to make contact with the pretreated substrate while it is at a temperature of at least about 350–375° F. (at actual contact or juncture with the pretreated substrate), particularly in the instances when polyethylene is being laminated. This generally requires the molten polymer in the extruder barrel, as it leaves the die lips, to be at a temperature between about 550 and 600° F.

In this connection, although the molten polyolefin may be passed any distance through the atmosphere from the outlet of the die 28 to the point of juncture with the pretreated substrate, it is generally advantageous for a distance of not more than 12, advantageously about 6 to 10, inches to be utilized.

Immediately upon being applied, the polyolefin layer from the molten sheet 30 is chilled, solidified and laminated in place by the action of the chill roll 25 which is maintained at a temperature above the sticking temperature of the polyolefin but below its fusion point, which temperature, frequently is most advantageously maintained in the range from about 80 to 100° F.

After being laminated in place, the polyolefin layer 14 on the treated substrate 12 provides the composite foil product 10 of the present invention. The composite product may be taken up for subsequent use by any suitable means or in any desired manner, such as the into take-up roll 31 into which the composite foil is shown being wound in FIGURE 3 of the drawing. Of course, if desired, it can be directly passed, without intermediate take-up, to any subsequent manufacturing operation in which it may be employed.

As a matter of actual practice, it is generally advantageous to form the pretreated substrate in the manner illustrated in FIGURE 4 of the drawing. This provides for a supply of the intermediate treated substrate for subsequent lamination of such material. As shown in FIGURE 4, the adhesion-promoting polyalkylene imine coating 13 is provided and dried in place by spread coating the applicating solution thereof on the substrate 11 to form the intermediate, polyalkylene imine-treated substrate material 12. Thus, instead of spraying the applicating solution of the polyalkylene imine onto the surface of the substrate 11, it may advantageously be applied from a gravure coating roll and dried prior to take-up as an intermediate product.

As is specifically illustrated in FIGURE 4, a supply of the substrate 11 in roll 32 is unwound and passed between a pair of cooperating rollers consisting of a gravure roll 36 (which advantageously may be knurled) and an upper impression roll 39 (which advantageously may have a rubber or the like surface). The gravure roll 36 is immersed in a suitable supply 34 of applicating solution of the polyalkylene imine contained in a gravure tank or the like container 33. The gravure roll 36, operating in the direction indicated by the arrow, picks up the applicating solution 34 of the polyalkylene imine and applies it to the surface of the substrate 11 being treated. Excess applicating solution may advantageously be wiped from the surface of the gravure roll 36 by a doctor knife 37 or the like scraper to ensure uniform application and avoid excesses of the solution. The treated substrate material is then passed around a roll 40 through a dryer 44 wherein the solvent vehicle is removed from the polyalkylene imine to provide the pretreated substrate intermediate 12. The intermediate product 12, advantageously, may then be taken up into a supply roll 44 as stock material for subsequent use in the laminating operation.

Great care should be taken in applying the molten polyolefin to the surface of the pretreated substrate. It is essential that the sheet of fused polymer to be laminated into the composite film product is not allowed to become solidified before contacting the treated substrate, as by first falling on the chill roll before entering the nip of the rolls wherein the lamination is effected. It is generally desirable, as illustrated in FIGURE 5 of the drawing, to feed the molten polyolefin polymer 30 onto the surface of the pretreated substrate 12 just before the material to be laminated is passed through the nip of the cooperating rollers 24–25.

Actually, better results are generally obtained when the molten polyolefin 30 makes initial contact or juncture with the substrate prior to being chilled at just about the nip of the rolls, although suitable results are obtained if contact is made some distance back before the nip. Generally, however, the actual lateral distance at which contact is made before entering the nip of the rolls 24–25 (as illustrated by the dimension "$x$" in FIGURE 5) should be within several inches and advantageously within about 1 inch from the nip of the roll.

In order to further illustrate the invention, a 0.00035 inch aluminum foil was surface-treated with polyethylene imine at the rate of about 1 gallon of applicating solution per 600 square yards of foil using an applicating solution consisting of about ⅜ percent by weight, based on the weight of the applicating solution, of polyethylene imine in ethanol. This represented an actual application of about 30 grams of the polyethylene imine per thousand square feet of film surface. The polyethylene imine employed had an average molecular weight on the order of about 7,000. The applicating solution was prepared by mixing the alcohol with ¾ percent by weight of a 50 percent aqueous solution of the polyethylene imine.

The application of the polyethylene imine solution was made in a manner similar to that illustrated in FIGURE 4 of the drawing, using gravure rolls having a diameter of about 6 inches and a width of about 40 inches for application of the solution to the aluminum foil substrate. After application of the polyethylene imine the adhesion-promoting coating thereof was dried on the surface of the substrate in an oven at a temperature of about 150° F. prior to being taken up as a stock or supply roll of the intermediate pretreated substrate film.

The thereby-obtained pretreated substrate was then laminated with polyethylene using a procedure as illustrated in FIGURE 5 of the drawing. The polyethylene imine coated substrate foil was run at a linear rate of about 100 feet per minute under an extruder for the polyethylene discharging into the nip of a pair of rolls, consisting of an 18 inch diameter back-up roll and a 2 foot diameter chill roll (with the chill roll being maintained at about 80° F.), through which the substrate was being passed.

About a 2 mil layer of polyethylene was applied from the extruder to the pretreated substrate by feeding the molten polymer layer in the form of a falling sheet or curtain (through about an 8 inch fall) from the die lips to the nip of the rolls. The temperature of the polyethylene in the barrel of the extruder at the die was about 600° F. Its temperature at contact with the substrate was about 375° F.

The polyethylene employed was the conventional, branch-structured variety of polyethylene (of the "polythene" type) having a melt index (according to ASTM D-1238-52T) of about 3.0. After being cooled and solidified and laminated in place, the resulting composite foil structures were taken up into a supply roll.

The resulting composite foil structure was tested to determine the cohesive properties of the laminated layers therein and the heat sealability of the product by means of a heat seal peel test. The test consisted of measuring the force in pounds that was necessary to separate 1 inch wide strips of the applied polyethylene layers which had been heat sealed together at 300° F. and pulled in a Scott Tester in the machine direction. The composite foil did not fail in any instance, either as regards the laminated layers or the heat sealed strips, when less than 3 pounds of pull were exerted on any of the sealed specimens tested.

About the same results are obtained when the foregoing procedure is repeated excepting to laminate essentially linear and unbranched polyethylene in the composite film structure being made; or to apply a layer of polyethylene or a layer of a copolymer of polypropylene and ethylene (such as one containing about equal weight percentages of each monomer in the polyolefin product) on the treated substrate; or when lead foil substrates are utilized; or when other polyalkylene imines within the scope indicated in the foregoing specification are employed to provide the adhesion-promoting coating on the surface of the metal substrate with which the polyolefin layer is laminated.

Certain changes and modifications in the practice of the present invention can be readily entered into without substantially departing from its intended spirit and scope. Therefore, it is to be fully understood that the invention is not to be limited or in any way restricted by the preferred embodiments thereof which are set forth in the foregoing description and specification. Rather, its purview is to be interpreted and construed in the light of what is set forth and delineated in the hereto appended claims.

What is claimed is:

1. A method for preparing a composite laminate structure which comprises applying to the surface of a substrate of metal selected from the group consisting of aluminum and lead between about 5 grams and about 100 grams per thousand square feet of substrate surface of a polyalkylene imine comprised of alkylene units containing from 2 to about 4 carbon atoms as an adhesion-promoting preliminary and intermediate coating on the surface of said substrate; then depositing a molten layer of a normally solid, film-forming, non-aromatic hydrocarbon polymer over said intermediate coating of said polyalkylene imine on said preliminary treated substrate; then cooling said applied polyolefin layer to a normal temperature to solidify same on said substrate and form a tightly adhering and effectively laminated polyolefin layer on said substrate.

2. The method of claim 1, wherein said polyalkylene imine is polyethylene imine.

3. The method of claim 1 and including, in addition thereto and in combination therewith, the steps of applying said polyalkylene imine to the surface of said substrate from an applicating solution of said polyalkylene imine in a volatile solvent vehicle therefor and, after said application, drying said solvent vehicle from said applied polyalkylene imine.

4. The method of claim 3, wherein said solution contains between about 0.01 and 2 weight percent, based on the weight of said solution, of said polyalkylene imine dissolved therein.

5. The method of claim 3, wherein said solution contains between about 1/8 and 1/2 weight percent, based on the weight of said solution, of said polyalkylene imine dissolved therein.

6. The method of claim 3, wherein said solvent is a lower alkyl alcohol.

7. The method of claim 1, wherein said metal substrate is aluminum.

8. The method of claim 1, wherein said metal substrate is a foil having a thickness between about 1/4 mil and about 10 mils.

9. The method of claim 1, wherein said laminated polyolefin layer has a thickness between about 1/4 mil and about 10 mils.

10. The method of claim 1, wherein said polyalkylene imine is applied on the surface of said metal substrate in an amount between about 20 and about 50 grams per thousand square feet of substrate surface.

11. The method of claim 1, wherein said molten polyolefin layer is placed in contact with said polyalkylene imine-treated substrate at a temperature, at actual contact of said molten polyolefin with the surface of said treated substrate, of at least about 350–375° F. but beneath the decomposition temperature of said polyolefin.

12. Composite structure which comprises, in intimate joined lamination, (1) a substrate layer of a metal selected from the group consisting of aluminum and lead having a thickness of at least about 1/4 mil, said substrate layer being uniformly coated with (2) an intermediate adhesion-promoting layer of between about 5 and about 100 grams per thousand square feet of substrate surface of a polyalkylene imine comprised of alkylene units containing from 2 to about 4 carbon atoms; and (3) a tightly adhered superficial layer over said applied coating of polyalkylene imine of a film-forming non-aromatic hydrocarbon polymer having a thickness between about 1/4 mil and about 10 mils.

13. The composite structure of claim 12, wherein said substrate layer has a thickness between about 1/3 mil and about 1/2 mil.

14. The composite structure of claim 12, wherein said substrate layer consists of aluminum foil.

15. The composite structure of claim 12, wherein said substrate layer consists of lead foil.

16. The composite structure of claim 12, wherein the polyalkylene imine adhesion-promoting intermediate layer is polyethylene imine.

17. The composite structure of claim 12, wherein said substrate layer is coated with between about 20 and about 50 grams per thousand square feet of substrate surface of said polyalkylene imine.

18. The composite structure of claim 12, wherein said layer of non-aromatic hydrocarbon olefin polymer has a thickness of between about 1 and 2 mils.

19. The composite structure of claim 12, wherein said non-aromatic hydrocarbon olefin polymer is polyethylene.

20. The composite structure of claim 12, wherein said non-aromatic hydrocarbon olefin polymer is polypropylene.

References Cited in the file of this patent

UNITED STATES PATENTS

| | | |
|---|---|---|
| 2,622,056 | De Coudres et al. | Dec. 16, 1952 |
| 2,744,841 | Cassis | May 8, 1956 |
| 2,824,034 | Worby | Feb. 18, 1958 |
| 2,828,237 | Rosser | Mar. 25, 1958 |
| 2,911,321 | Herrmann et al. | Nov. 3, 1959 |